Sept. 24, 1929.     M. E. REAGAN     1,729,455
AUTOMATIC STATION
Filed Oct. 5, 1926
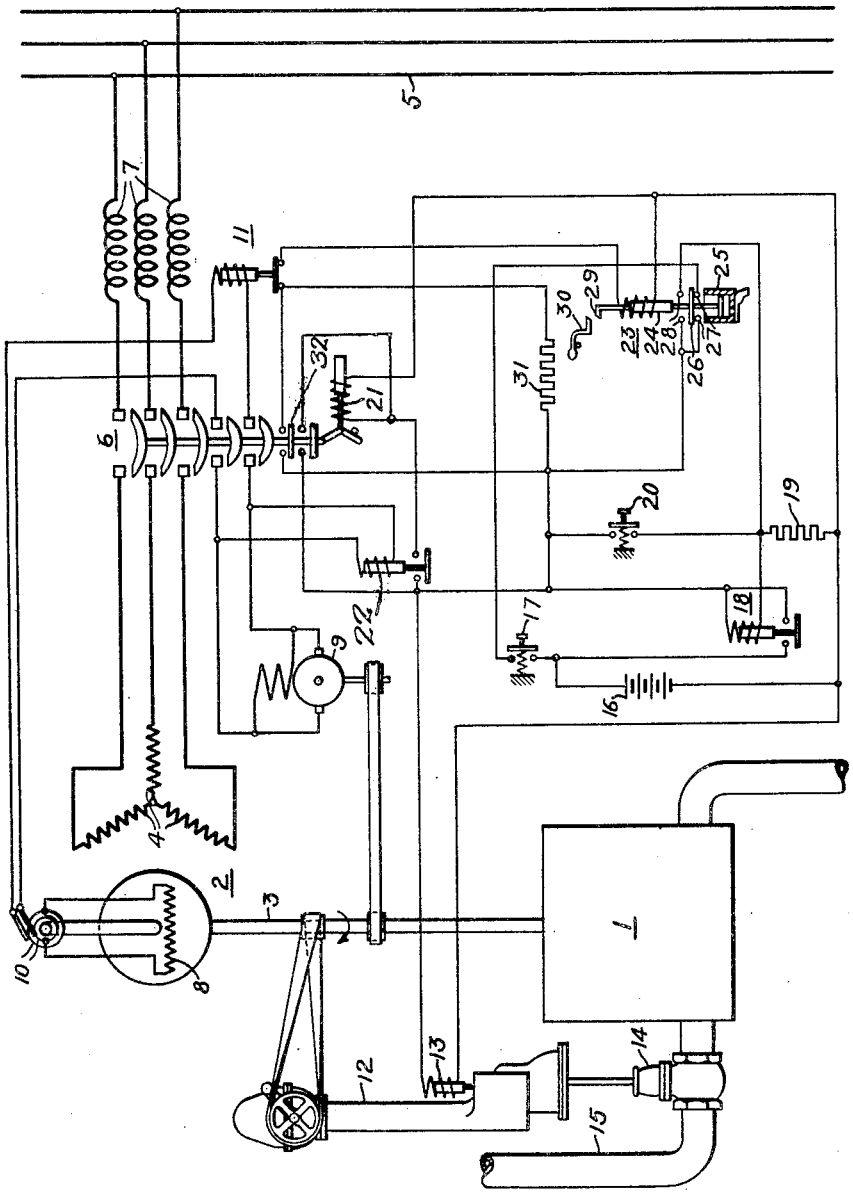
WITNESSES:
INVENTOR
Maurice E. Reagan.
BY
ATTORNEY Patented Sept. 24, 1929

1,729,455

UNITED STATES PATENT OFFICE

MAURICE E. REAGAN, OF SWISSVALE, PENNSYLVANIA, ASSIGNOR TO WESTINGHOUSE ELECTRIC & MANUFACTURING COMPANY, A CORPORATION OF PENNSYLVANIA

AUTOMATIC STATION

Application filed October 5, 1926. Serial No. 139,736.

My invention relates to automatic stations and more particularly to prime-mover generating stations in which protective means are provided for controlling the operation of the prime mover and generator in accordance with the time elapsed between the starting of the prime mover from rest and the connection of the generator to the power system, and in response to a failure of energy supply to the field-magnet winding of the generator for a predetermined interval of time while the generator is connected to the power system.

One object of my invention is to provide a single timing means for controlling the operation of the translating equipment in a prime-mover generating station either in accordance with the length of time elapsed between the starting of the prime mover from rest and the connection of the generator to the power circuit or in response to a failure of energy supply to the field-magnet winding of the generator for a predetermined interval of time while the generator is connected to the power system.

Another object of my invention is to provide means for automatically recalibrating the single timing means, above referred to, to render the same operative after one predetermined interval of time in response to the first-mentioned condition and after a different interval of time in response to the second-mentioned condition.

A further object of my invention is to provide a system of the above-identified character that shall be simple and reliable in operation and economical to construct.

The use of timing means in automatic stations to shut down or to lock out the translating equipment if the same is not connected to the electrical system within a predetermined interval of time after being started from rest is well known in the art. The provision of means for stopping the operation of such translating equipment in response to a failure of energy supply to the field-magnet winding of a generator is also well known.

In my present invention, however, I provide a single timing means whereby the translating equipment is automatically shut down and locked out of service if the generator is not connected to the electrical system within a predetermined interval of time after being started from rest and for accomplishing the same result if there should be a failure of energy supply to the field-magnet winding of the generator for a shorter predetermined interval of time while the generator is connected to the electrical system.

My invention will be better understood by reference to the following description, taken in connection with the accompanying drawing, the single figure of which is a diagrammatic representation of an electrical system embodying my invention.

Referring to the drawing, a prime mover 1 is adapted to drive the rotating member of a generator 2 by means of a shaft 3. The generator 2 comprises stator windings 4 that are adapted to supply energy to an electric circuit 5 through a circuit interrupter 6 and a plurality of reactors 7. The rotating member of the generator 2 comprises a field-magnet winding 8 that is energized by an exciter generator 9 through the circuit interrupter 6 and slip rings 10.

The exciter generator 9 is driven from the shaft 3 by means of a belt or other suitable means. The circuit extending from the generator 9 to the field-magnet winding 8 of the generator 2 comprises a series connected operating coil of a relay device 11, the purpose of which will be hereafter described.

The operation of the prime mover 1 is controlled by a governor 12 which may be of any well known type. The governor illustrated is driven by a belt from the shaft 3 and comprises a controlling coil 13 that is adapted, when energized, to render the governor effective to initiate the operation of the prime mover 1 and to permit the continuation of such operation as long as the coil remains energized. The governor 12 controls the operation of the prime mover 1 by suitably varying the degree of opening of a gate valve 14 which controls the admission of fluid energy from a supply (not shown)

to the prime mover 1 through a pipe or conduit 15.

The operating coil 13 of the governor 12 is adapted to be energized from a control source, such as a battery 16, through a control switch 17 and the switch of a master relay 18 which is closed when the operating coil of this relay is energized. The energization of the operating coil of the master relay 18 is initiated by the battery 16 when the control switch 17 is closed and is thereafter maintained by a circuit completed by its own switch. This energizing circuit includes a series-connected resistor 19 and is adapted to be broken by the closure of a control switch 20 that is connected in parallel relation to the terminals of the operating coil of the master relay 18 for the purpose of short-circuiting the same.

The operation of the circuit interrupter 6 is controlled by an operating coil 21 that is adapted to close the interrupter 6 when energized and to permit the opening thereof when deenergized. The energization of the coil 21 is effected by the battery 16 in response to the closure of the switch of a relay 22, the operating coil of which is connected in parallel relation to the terminals of the exciter generator 9.

A timing relay 23 is provided with an operating coil that is energized from the battery 16 when the control switch 17 or the switch of the master relay 18 is closed and the operating coil of the relay 11 is deenergized to permit the switch of this relay to be closed. The timing relay 23 comprises a movable core member 24 and suitable retarding means therefor, such as a dash-pot 25, which is effective to retard the operation of the core member 24 when operating coil of the relay is energized, but which is ineffective to retard the return of the core member 24 to its initial position when the operating coil of the relay is deenergized.

The relay 23 also comprises a contact-bridging member 26 that is adapted to be actuated by the core member 24 to engage two pairs of contact members 27 and 28 selectively. When the operating coil of the relay 23 is deenergized, the contact-bridging member 26 engages the contact members 27, and, when this coil has been energized to a predetermined degree for a predetermined interval of time, the core member 24 is actuated to such position that the contact-bridging member 26 engages the contact members 28. In this position of the core member 24, a latching member 29 that is mounted thereon is engaged by a pivotally mounted latching member 30 to prevent the return of the core member 24 to its initial position until the latching member 30 is manually actuated out of engagement with the latching member 29.

A resistor 31 is connected in series with the operating coil of the timing relay 23 to control the degree of energization thereof. An auxiliary switch 32 of the circuit interrupter 6 is connected in parallel relation to the resistor 31, whereby this resistor is short-circuited and rendered ineffective when the circuit interrupter 6 is closed. Under this condition the degree of energization of the operating coil of the relay 23 is increased to render this relay operative to actuate its core member more rapidly than when the resistor 31 is effective to reduce the degree of energization of this operating coil. An additional auxiliary switch 32' of the interrupter 6 completes an obvious locking circuit for the closing coil thereof.

In describing the operation of the system embodying my invention, it will be assumed that the prime mover 1 and the generator 2 are at rest and that the circuit interrupter 6 is open to disconnect the stator windings 4 of the generator 2 from the electric circuit 5.

When it is desired that the operation of the prime mover 1 and the generator 2 be initiated, the control switch 17 is closed. It will be understood that this switch may be either manually operated or automatically operated in response to any desired predetermined condition. The closure of the switch 17 completes a circuit from the upper terminal of the battery 16 through the switch 17, the contact members 27 and contact-bridging member 26 of the timing relay 23, which are normally in engagement, the operating coil of the master relay 18, and the resistor 19 to the lower terminal of the battery 16. The operating coil of the master relay 18 is thus energized to cause this relay to close its switch which is connected in parallel relation to the series-connected switch 17 and the contact members 27 of the timing relay 23. The energization of the operating coil of the master relay 18 is therefore maintained through its own switch.

When the control switch 17 is closed, and as long as the master relay 18 remains energized to maintain its switch closed, the operating coil 13 of the governor 12 is energized from the battery 16, thereby causing the governor 12 to open the gate valve 14. Fluid energy is thereupon admitted to the prime mover 1 to initiate the operation of the same.

The rotating member of the generator 2 is thus started from rest and brought up to substantially its normal operating speed under the control of the governor 12. When this speed is attained, the potential developed by the exciter generator 9 will be sufficient magnitude to cause the relay 22 to close its switch to effect energization of the operating coil 21 of the circuit interrupter 6 from the battery 16. The energizing circuit for the operating coil 21 includes the switch of the master relay 18, in order that this circuit may be broken when the master relay 18 is deenergized.

When the operating coil 21 of the circuit interrupter 6 is energized, this circuit interrupter is actuated to its closed position to connect the stator windings 4 of the generator 2 to the electric circuit 5 through the reactors 7. At the same time, the exciter generator 9 is connected to the rotating field-magnet winding 8 of the generator 2 through the slip rings 10. The field-magnet winding 8 is excited at the same time that the stator windings 4 are connected to the electric circuit 5, and the generator 2 immediately falls into synchronism with the circuit 5. The reactors 7 are provided in order that this synchronizing may be effected without disturbance to the circuit 5. The generator 2 is now driven by the prime mover 1, under the control of the governor 12, to supply energy to the circuit 5.

At the time that the control switch 17 was closed to initiate the operation of the prime mover 1 and the generator 2, the operating coil of the timing relay 23 was energized from the battery 16 through the control switch 17, the contact members 27 and contact-bridging member 26 of the relay 23, the resistor 31, and the switch of the relay 11. The operating coil of the timing relay 23 remains energized in this manner until the circuit interrupter 6 is closed, since the switch 17 and contact members 27 are immediately shunted by the switch of the master relay 18, when the coil of the relay is included in a circuit extending from the upper terminal of the battery 16, thru the switch of the relay 18, the resistor 31, the switch of the relay 11, and the coil of the relay 23 to the lower terminal of the battery 16.

When the circuit interrupter 6 is closed, the operating coil of the relay 11 is energized by the current traversing the circuit extending from the exciter generator 9 to the field-magnet winding 8, thereby causing this relay to open its switch. The operating coil of the timing relay 23 is thereupon deenergized to permit the core member 24 of this relay to return immediately to its original position. The switch 32' locks the interrupter in the closed position.

The foregoing description is based upon the assumption that the generator 2 is brought up to normal speed and connected to the circuit 5 within a normal period of time after being started from rest. If, however, anything should prevent such normal operation, the operating coil of the timing relay 23 would be energized for a sufficient interval of time to cause the core member 24 to actuate the contact-bridging member 26 into engagement with the contact members 28. The core member 24 is then latched in its actuated position by the latching members 29 and 30 and remains so latched until the latching member 30 is manually actuated to disengage the latching member 29, as previously described.

When the contact-bridging member 26 engages the contact members 28, the operating coil of the master relay 18 is short-circuited between its switch and the resistor 19 to permit this relay to open its switch, thereby deenergizing all of the controlling apparatus in the station, including the operating coil 13 of the governor 12. The gate valve 14 is thereupon closed to cause the prime mover 1 and the generator 2 to come to rest. Further operation of the station is precluded, since the short-circuit of the operating coil of the master relay 18 is maintained by relay 23. Closure of the switch 17 while the core member 24 of the relay 23 is in its latched position does not effect restarting of the prime mover 1 and generator 2, because the starting circuit that is normally controlled by the switch 17 is broken by reason of the fact that the contact-bridging member 26 of the relay 23 is latched out of engagement with the contact members 27.

It will be seen that, prior to the closing of the circuit interrupter 6, the resistor 31 is effective to limit the degree of energization of the operating coil of the timing relay 23. The resistance of the resistor 31 is so chosen that the interval of time required by the relay 23 for operation at this degree of energization is equal to the maximum interval of time desired between the starting of the prime mover 1 and the generator 2 from rest and the connection of the generator 2 to the circuit 5.

When the circuit interrupter 6 is closed, the resistor 31 is short-circuited by the auxiliary switch 32 to increase the degree of energization of the operating coil of the relay 23. Energization of this coil is normally precluded, however, by reason of the fact that the switch of the relay 11 is open. The relay 11 maintains its switch open as long as energy is being supplied to the field-magnet winding 8 of the generator 2 by the exciter generator 9.

If this supply of energy should fail, for any reason, it is desired that further operation of the station be precluded, and this result is accomplished by the operation of the relay 23 in the manner previously described. Since the operating coil of the relay 23 is energized to a greater degree than previously, by reason of the short-circuiting of the resistor 31 by the auxiliary switch 32 of the circuit interrupter 6, the relay 23 is operative in a shorter interval of time than previously. The relay 23 is so calibrated that this interval of time is the maximum interval during which deenergization of the field-magnet winding 8 of the generator 2 may be permitted.

From the foregoing description, it will be seen that I have provided a single timing means for controlling the operation of a translating station in response either to the amount of time elapsed between the starting of a translating device from rest and the connection of the same to an electric circuit, or to the length of time during which the field-magnet winding of the translating device is deenergized while the translating device is connected to the electric circuit.

While I have illustrated and described a single embodiment of my invention, I do not wish to be limited thereto, as it will be obvious to those skilled in the art that various cahnges and modifications may be made therein without departing from the spirit and scope of my invention, as set forth in the appended claims.

I claim as my invention:

1. The combination with an electric circuit, an electric translating device, a field-magnet winding therefor, means for supplying energy to the field-magnet winding, means for starting the translating device from rest and accelerating it to substantially its normal operating speed, and means for connecting the translating device to the electric circuit, of timing means operative to preclude the connection of the translating device to said circuit if said connection be not effected within a predetermined time, and means controlled by the means for connecting the translating device and the electric circuit for rendering said timing means operative to control the operation of the translating device when the field-magnet winding of the translating device has been de-energized for a predetermined interval of time different from said first-mentioned time.

2. The combination with an electric circuit, an electrical translating device, a field-magnet winding therefor, means for supplying energy to the field-magnet winding, means for starting the translating device from rest and accelerating it to substantially its normal operating speed, and means for connecting the translating device to the electric circuit, of timing means operative to stop the operation of the translating device if the translating device is not connected to the electric circuit within a predetermined interval of time after being started from rest, and means controlled by the connecting means for rendering said timing means operative to stop the operation of the translating device when the field-magnet winding of the translating device has been de-energized for a predetermined interval of time different from said first-mentioned interval.

3. The combination with an electric circuit, an electrical translating device, a field-magnet winding therefor, means for supplying energy to the field-magnet winding, means for starting the translating device from rest and accelerating it to substantially its normal operating speed, and means for connecting the translating device to the electric circuit, of timing means operative to stop the operation of the translating device if the translating device is not connected to the electric circuit within a predetermined interval of time after being started from rest, and means controlled by said connecting means for rendering said timing means operative to stop the operation of the translating device when the field-magnet winding of the translating device has been de-energized for a different predetermined interval of time.

4. The combination with an electric circuit, an electrical translating device, a field-magnet winding therefor, means for supplying energy to the field-magnet winding, means for starting the translating device from rest and accelerating it to substantially its normal operating speed, and means for connecting the translating device to the electric circuit, of timing means operative to prevent further operation of the translating device if the translating device is not connected to the electric circuit within a predetermined interval of time after being started from rest, and means for rendering said timing means operative to prevent further operation of the translating device when the field-magnet winding of the translating device has been de-energized for a predetermined interval of time different from said first-mentioned interval.

5. The combination with an electric circuit, an electrical translating device, field-magnet winding therefor, means for supplying energy to the field-magnet winding, means for starting the translating device from rest and accelerating it to sbstantially its normal operating speed, and means for connecting the translating device to the electric circuit, of timing means operative to prevent further operation of the translating device if the translating device is not connected to the electric circuit within a predetermined interval of time after being started from rest, and means for rendering said timing means operative to prevent further operation of the translating device when the field-magnet winding of the translating device has been de-energized for a different predetermined interval of time.

6. The combination with an electric circuit, an electrical translating device, a field-magnet winding therefor, means for supplying energy to the field-magnet winding, means for starting the translating device from rest and accelerating it to substantially its normal operating speed, and means for connecting the translating device to the electric circuit, of timing means operative to prevent further operation of the translating device if the translating device is not connected to the electric circuit within a predetermined interval of time after being started from rest, and a switch controlled by the connecting means for varying the sensitivity of the timing means to render the same operative to prevent further operation of the translating device when the field-magnet winding of the translating device has been de-energized for a different predetermined interval of time.

7. The combination with an electric circuit, an electrical translating device, a field-magnet winding therefor, means for supplying energy to the field-magnet winding, means for starting the translating device from rest and accelerating it to substantially its normal operating speed, and means for connecting the translating device to the electric circuit, of timing means operative to prevent further operation of the translating device either if the translating device be not connected to the electric circuit within a predetermined interval of time after it is started from rest or when the field-magnet winding has been de-energized for a predetermined interval of time different from said first-mentioned interval while the translating device is connected to the electric circuit.

8. The combination with an electric circuit, an electrical translating device, a field-magnet winding therefor, means for supplying energy to the field-magnet winding, means for starting the translating device from rest and accelerating it to substantially its normal operating speed, and means for connecting the translating device to the electric circuit, of timing means operative to prevent further operation of the translating device either if the translating device be not connected to the electric circuit within a predetermined interval of time after it is started from rest or if the field magnet winding remains de-energized for a different predetermined interval of time while the translating device is connected to the electric circuit.

9. In combination, an electric circuit, an electrical translating device, a field-magnet winding therefor, means for supplying energy to the field-magnet winding, connecting means between the translating device and the electric circuit, a switch in circuit with said field-magnet winding controlled by said connecting means, a relay device having an operating coil connected in series with said field-magnet winding, timing means arranged to control the operation of the translating device, an operating coil for the timing means, means for energizing said operating coil controlled by said relay device, current-limiting means in circuit with said operating coil, and means controlled by the connecting means for controlling the effectiveness of said current-limiting means.

10. In combination, an electric circuit, an electrical translating device, a field-magnet winding therefor, means for supplying energy to the field-magnet winding, connecting means between the translating device and the electric circuit, a switch in circuit with said field-magnet winding controlled by said connecting means, a relay device having an operating coil connected in series with said field-magnet winding, timing means arranged to control the operation of the translating device, an operating coil for the timing means, means for energizing said operating coil controlled by said relay device, a resistor in circuit with said operating coil, and a switch controlled by the connecting means between the translating device and the electric circuit to short-circuit said resistor when said connecting means are closed.

11. The combination with an electric circuit, an electrical translating device, a field-magnet winding therefor, means for supplying energy to the field-magnet winding, means for starting the translating device from rest and accelerating it to substantially its normal operating speed, and means for connecting the translating device to the electric circuit, of timing means comprising a single relay operative to prevent further operation of the translating device either if the translating device be not connected to the electric circuit within a predetermined interval of time after it is started from rest or if the field-magnet winding remains de-energized for a predetermined interval of time different from said first-mentioned interval while the translating device is connected to the electric circuit.

In testimony whereof, I have hereunto subscribed my name this 28th day of September, 1926.

MAURICE E. REAGAN.